July 29, 1958  A. C. VINE ET AL  2,845,221
BUOYANCY RECORDER
Filed Sept. 11, 1953  5 Sheets-Sheet 1
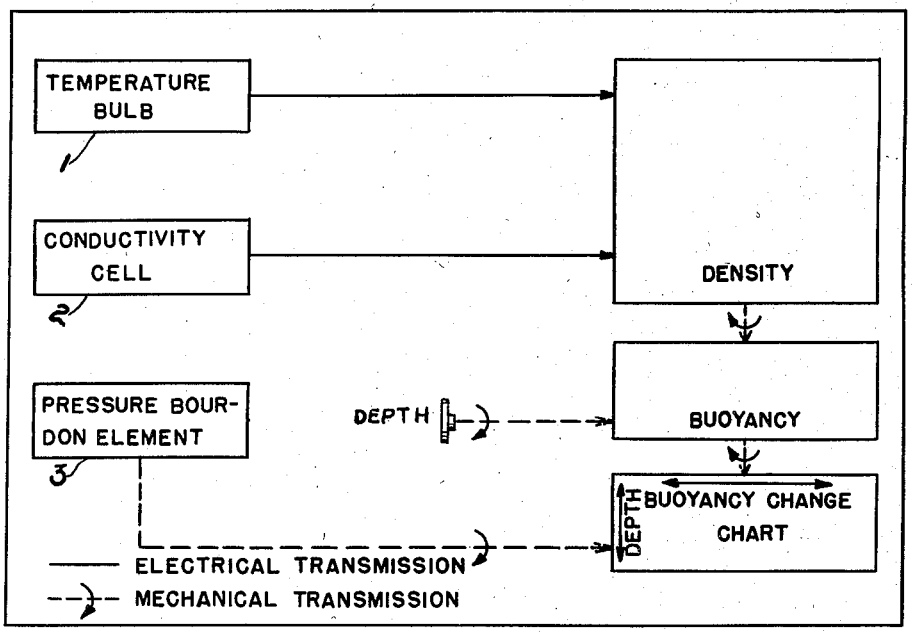
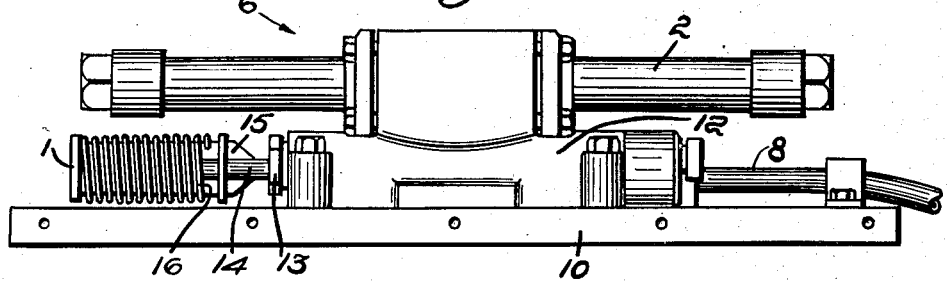
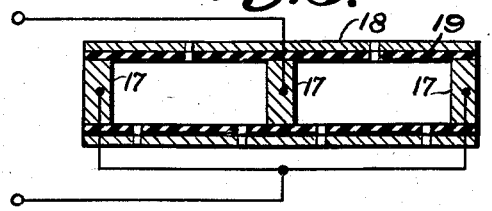
Inventors:
Allyn C. Vine,
John F. Holmes,
Wyman C. Rutledge,
by
Attorneys

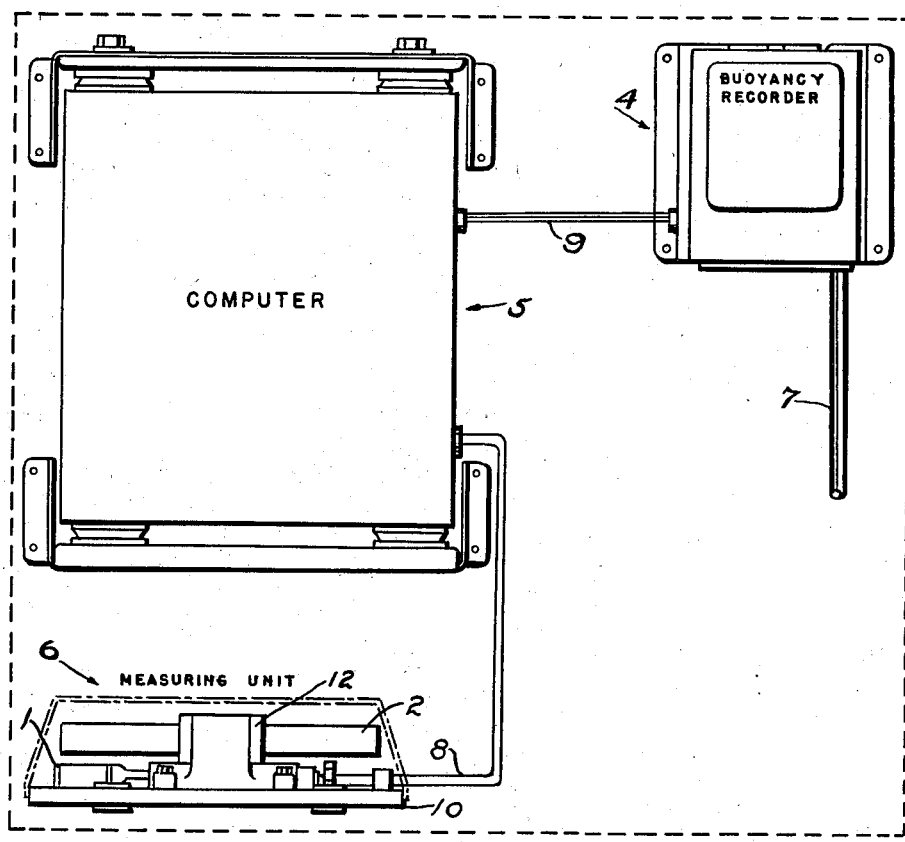
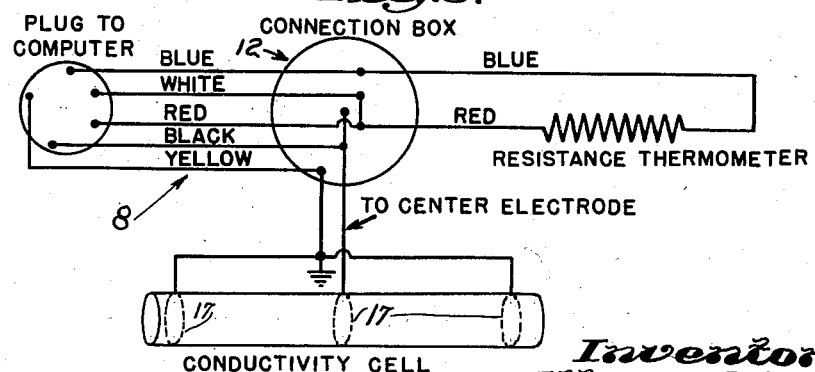

THE SELECTED BRIDGE CIRCUIT

July 29, 1958  A. C. VINE ET AL  2,845,221
BUOYANCY RECORDER
Filed Sept. 11, 1953  5 Sheets-Sheet 4

Inventors
Allyn C. Vine,
John F. Holmes,
Wyman C. Rutledge,
by
Attorneys

July 29, 1958    A. C. VINE    2,845,221
BUOYANCY RECORDER

Filed Sept. 11, 1953    5 Sheets-Sheet 5

Inventors:
ALLYN C. VINE,
JOHN F. HOLMES,
WYMAN C. RUTLEDGE by

W. R. Maltby
D. E. Snyder
Attorneys

United States Patent Office 2,845,221
Patented July 29, 1958

2,845,221
BUOYANCY RECORDER

Allyn C. Vine, Woods Hole, and John F. Holmes, Falmouth, Mass., and Wyman C. Rutledge, Elmsford, N. Y., assignors to the United States of America as represented by the Secretary of the Navy Application September 11, 1953, Serial No. 379,748

3 Claims. (Cl. 235—61)

This invention relates to a measuring and recording device which is designed especially for use on submarines in measuring and integrating various sea water variables, especially those variables which are important in connection with submarine diving and trim setting operations involving a change of ballast.

When operating a submarine under water, it is exceedingly important to know as accurately as possible what the buoyancy of the sea water may be in order to maintain the vessel at a desired depth or to facilitate other types of operation. A vessel in good trim, at a given point under water, is said to have zero buoyancy. If the vessel moves to different depths or to a point where the density of the sea water changes, then a change in ballast becomes necessary in order to re-establish zero buoyancy. Change in ballast is also dependent upon the hull compressibility of the submarine as well as density of sea water, and the latter value in turn depends upon calculations involving the mutual relations of other sea water variables such as temperature, salinity and pressure. Inasmuch as sea water variables such as temperature, pressure, salinity and the like, measured in one region in sea water, may vary appreciably from similar determinations taken at different regions, it becomes very difficult to record changes in these variables and to make calculations rapidly which can be relied upon to determine ballast changes during the operation of a submarine. A somewhat analogous situation prevails with respect to making sound velocity determinations under water.

It is a general object of the invention to devise an apparatus which is capable of dealing with the problem indicated and which will provide a positive, efficient and reliable instrument by means of which desired sea water variables are continuously measured and automatically computed to present accurate indications of ballast changes required to establish and maintain zero buoyancy at different stations under water.

In a more specific aspect, the invention is concerned with the provision of a relatively simplified apparatus which constitutes a substantial improvement over the type of computing device described and claimed in a patent application by Vine et al., Serial No. 387,816, filed October 22, 1953, now Patent No. 2,704,936, which arrangement comprises a satisfactory means of providing the desired measuring and recording factors. However, the very considerable amount of equipment using a fairly large number of parts presents difficulties with respect to installation and service, as well as introducing the possibility of error, and involving initial heavy costs. The apparatus of the present invention avoids several of the objectionable features of the earlier apparatus above noted by eliminating a part of the electrical equipment which was previously thought to be essential.

One important feature of the invention is the combination of a recording mechanism and a simplified self-balancing potentiometric circuit which controls the movement of a recording pen in accordance with the algebraic sum of a series of voltages, each of which, in turn, corresponds to a specific measured sea water variable.

Another important aspect of the invention is the automatic self-balancing computing circuit in which a normally balanced electrical network is arranged such that unbalance voltages corresponding to the primary measurements of temperature and conductivity changes are opposed by a voltage change developed at the sliding contact of a slide wire through which a predetermined current is flowing. A conventional alternating current servo system responsive to the difference of the voltage between the unbalance voltages and the slide wire contact voltage acts to adjust the slide wire contact position in accordance with a predetermined function of the originally measured variables until the difference voltage is zero and the network is rebalanced. The slide wire contact position thus serves to indicate the result of the desired computation and the adjustment of the slide wire contact also acts to adjust the position of an indicator pointer or pen arm with respect to a suitable scale.

Other objects and many of the attendant advantages of this invention will be readily appreciated as the same becomes better understood by reference to the following detailed description when considered in connection with the accompanying drawings wherein:

Fig. 1 is a functional diagram indicating the measuring elements employed to determine sea water variables and further illustrating the manner in which several variables are combined;

Fig. 2 is a side elevational view of an assembly for measuring electrical conductivity and temperature changes of sea water as observed at the hull of a submarine;

Fig. 3 is a detail longitudinal cross section of the electrical conductivity cell shown in Fig. 2;

Fig. 4 is a detail cross section taken transversely of the temperature sensitive bulb;

Fig. 5 is a composite view indicating in one assembly the several component parts of the measuring and recording apparatus;

Fig. 6 is a wiring diagram in which are included the measuring elements illustrated in Fig. 2;

Figure 7:
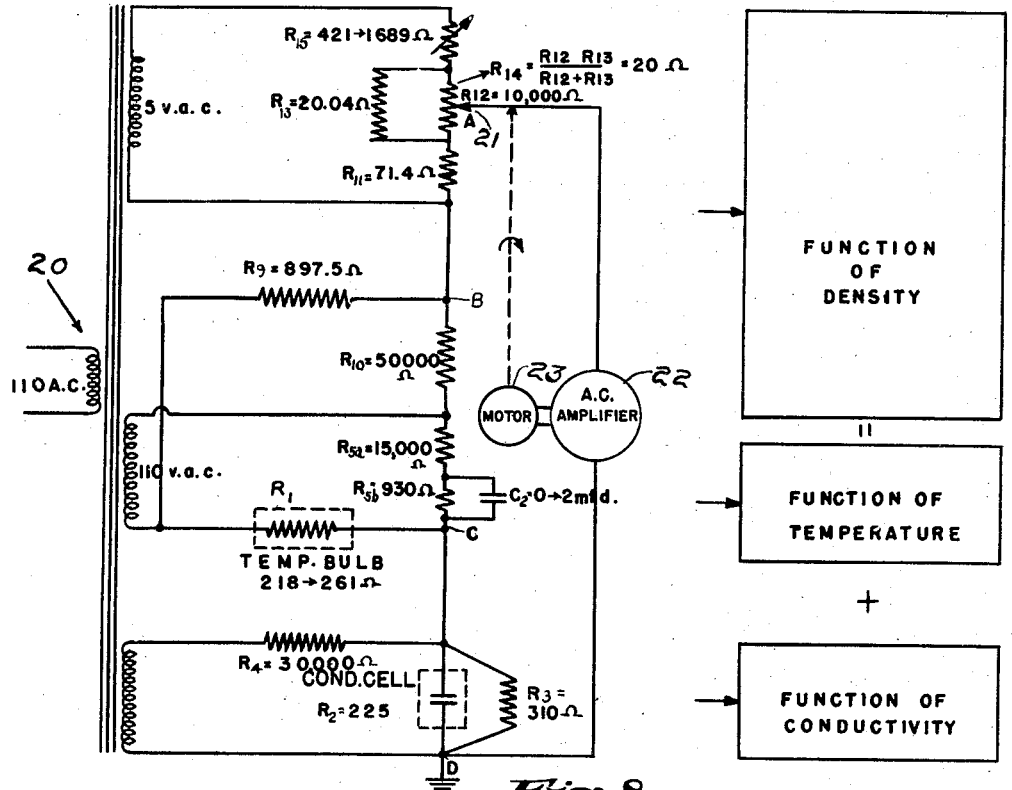
Fig. 7 is a wiring diagram indicating schematically the circuits for combining and interrelating electrical values supplied by the measuring elements.

Referring more in detail to the drawings, the more essential functions of the apparatus of the invention have been diagrammatically illustrated in Fig. 1. As indicated therein, the sea water variables of electrical conductance, temperature and pressure are measured by elements 1, 2 and 3, respectively, and these variables are referred to as the measured quantities. From the primary measurement of electrical conductance and temperature, as electrical resistance values, and with the aid of existing sea water data, certain related variables are derived in accordance with an empirical relationship as corresponding electrical voltages, thus, $E_T$ is obtained as a function of T (temperature) and $E_C$ is obtained as a function of C (conductance). These derived variable voltages are combined in accordance with the above-mentioned empirical relationship to provide indications representing more complex sea water conditions, such as salinity and density, which, in conjunction with a mechanically translated sea water pressure measurement, provide for movement of the indicator pointer or recording pen and thus furnish an indication of the buoyancy of the vessel as well as an indication of balance changes which may be necessary to maintain zero buoyancy.

In deriving electrical voltages which will properly correspond to those measured quantities to yield density changes corrected for salinity changes, it is necessary to employ certain mathematical functional relationships which are best represented in the form of an empirical equation. In setting up such equations, certain quantities are employed as noted in the following description: The density of sea water is defined as the mass per unit volume using the unit grams per cubic centimeter. Since the density of sea water varies approximately through the range of 1.00 to 1.030, it is conventional to subtract 1,000 from the numerical value and multiply the difference by 1,000 and thus represent a density of 1.02485, for instance, by the number 24.85. Salinity is defined as the total weight of salts in grams per thousand grams of sea water and is represented by the symbol 0/00. The mathematical functions employed to derive a relationship between density, temperature and salinity are deduced from established oceanographic tables containing these data. The effects of depth and density are similarly obtained. Reference may be made, for example, to H. U. Sverdrup, M. W. Johnson, and R. H. Fleming, "The Oceans," Prentice-Hall, Inc., New York, 1942, pages 347 to 357.

When data relating to temperature, conductivity and salinity are plotted, a family of curves are obtained which approximate the form of a hyperbola. Since these relationships are non-linear and complex, it is difficult to obtain an exact equation expressing the function, but a close approximation can be found. When the logarithms of salinity are plotted against the logarithms of conductivity for each value of temperature, the curves so obtained are approximately parallel and very nearly straight lines.

Similarly, the density of sea water is found to be related as a function of temperature and salinity and the complete family of curves can be approximated with reasonable accuracy by an empirical equation:

$$\sigma = K_1 \left[ \frac{\sqrt{(C+K_2)^2 - K_3}}{10^{K_4 T^n}} \right] - K_5, \text{ where} \begin{cases} \sigma = \text{Density} \\ C = \text{Conductance, mhos/c.c.} \\ T = \text{Temperature, ° Fahrenheit} \\ K_1 = 897.9 \\ K_2 = 0.0815 \\ K_3 = 0.006847 \\ K_4 = 0.003296 \\ K_5 = 20 \\ n = 1.07 \end{cases}$$

The particular constants are selected to give minimum error for densities which are most commonly encountered. This function, when expressed in logarithmic form, is as follows:

$$\log (\sigma + 20) = \log 897.9 + \tfrac{1}{2} \log [(C+0.0815)^2 - 0.006847] - 0.003296 T^{1.07}$$

It has also been found that the volume of a submarine hull is not appreciably altered by change in temperature during a normal dive. Therefore, changes in buoyancy are equal to change in density in water times the volume displacement of the hull plus the change in depth times the hull compression:

[Δbuoyancy = Δdensity × (hull displacement) + Δdepth × (hull compression)]

It is convenient to consider hull compression as the difference between actual hull compression and the compression of the displaced water itself. Inasmuch as the buoyancy changes due to hull compression are linear with depth, they do not need to be treated mathematically with buoyancy changes due to changes in temperature and conductivity but can later be added to the density output to give buoyancy.

An instrument which computes density from measurements of temperature and conductivity must combine these factors in such a manner as to be substantially in agreement with the empirically derived equation, and the established oceanographic tables. The principal parts of the instrument employed in carrying out the foregoing functions are shown in the assembly view of Fig. 5 and include a buoyancy recording unit 4 which is designed for mounting on the diving panel of a submarine, an electrical computer unit 5 which may be located at any desired point within the hull of a submarine, and a measuring unit 6 which is installed at some suitable point on the exterior surface of the hull of the submarine; a sea pressure conduit 7 is independently connected to the recorder unit 4. The measuring unit 6 is shown in greater detail in Fig. 2 and includes the temperature measuring bulb 1, located below a cylindrical conductivity cell 2. A base plate 10 is shown which is adapted to be secured at some convenient point along the exterior surface of a submarine, for example, at the underside of the vessel's hull, as near the central portion as possible. In this position, the measuring elements are constantly exposed to contact by sea water conditions in which the submarine is immersed. If desired, the base plate may be enclosed by a perforated cover, not shown in the drawings, of sufficient strength and rigidity to withstand normal sea water pressures commonly encountered in the operation of submarines. Supported on base plate 10 is a pressure resistant housing 12 in which electrical connections may be made.

The temperature measuring cell takes the form of a resistance bulb constructed, as shown in Fig. 4, by drawing a number of strands 15 of enameled, nickel wire into a long, small diameter, thin wall, copper capillary tube 16. The copper tubing is sealed at both ends and is wound on the ribs 15 of an open frame 14. The electrical connections are brought out through a suitable seal (not shown) in one end of tubing 16, through supporting frame 14 and a pressure-tight fitting 13 into pressure resistant housing 12. The length of nickel wire of thermometer bulb 1 is so chosen in accordance with well-known practices in the temperature measuring art that its resistance in normal operation varies approximately from 218 to 261 ohms. As constructed, the thermometer bulb 1 has a time constant of approximately 0.45 sec. and gives a response of 90% of the change encountered in one second, a valuable characteristic, which has been found essential in carrying out rapid calculations of the sort described.

Mounted above the temperature bulb 1, as illustrated in Fig. 2, is an electrical conductivity measuring cell 2 which is supported on the upper part of the pressure resistant housing 12. As shown more clearly in Fig. 3, the conductivity cell is made of an insulating tube 19 sheathed in a heavy, metallic shell 18 and includes three metallic disks 17 axially spaced to function as electrodes and to which an energizing potential may be applied. Sea water is permitted to flow freely through the conductivity cell.

When the conventional two electrode laboratory conductivity cell is immersed in a solution, the measured conductance includes the conductance of the paths within and external to the cell. Since the cross-sectional area of the external shunt path may be very large for a cell immersed in the sea, its conductance will be large compared to the conductance within the cell and a two electrode cell having an electrode at each end may be effectively short-circuited when used in this way. To avoid this difficulty, the two end electrodes are connected together electrically and the energizing potential is applied between them and a center electrode. The lead to the center electrode is insulated and approximately half of the current in this lead flows through the sea water sample to each end electrode. The two paths from the center electrode being in parallel, the measured conductance is the sum of the conductance of these paths. Inasmuch as the two end electrodes are grounded and thus short-circuited together, they are at the same potential and no current can flow between them through any external shunt path. With a fixed applied potential, the electric current in the wire connected to the center electrode is determined by the specific conductance of the sea water and by the dimensions of the cell and its electrodes. Since the dimensions of the cell are constant, the electric current can be used as a measure of the specific conductance and the number by which the measured conductance is multiplied to give the specific conductance is called the "cell constant." While cells of similar design can be readily made with constants within two or three percent of each other, it is expedient for accurate measurements to make an individual calibration for each individual cell before use. Preferably, each electrode is made of bronze tubing having a platinum lining to contact the sea water thereby avoiding the possibility of corrosion, even though the energizing potential is taken from an alternating current source.

Fig. 6 of the drawings illustrates a wiring diagram for the cable 8 by which the electrical connections are made from the measuring unit 6 to the computer unit 5, as above described.

It will be seen that the conductivity measuring unit 2 and the temperature measuring unit 1, if energized from an alternating current source, as shown in Fig. 7 will each reflect indicative voltage changes which may be electrically combined in accordance with the steps suggested in Fig. 1 to derive a density indication.

In accordance with well known practices in the temperature measuring art, in the temperature measuring bridge circuit of Fig. 7 the resistance values of R5, R9 and R10 are selected to provide bridge arm ratios and resistance valves such that the unbalance potential of the bridge caused by changes of thermometer bulb resistance corresponds to the term, $0.003296T^{1.07}$, of the empirical equation derived above. It is also equally evident that by suitable adjustment of series and shunt resistances, R3 and R4, respectively, the voltage appearing across conductivity cell 2 can be made to vary in accordance with the term $\frac{1}{2} \log [(C+0.0815)^2 - 0.006847]$ of the empirical equation. Suitable values for the electrical network of Fig. 7 are:

$R_1$ = 218 to 261 ohms
$R_2$ = 225 to ∞ ohms
$R_3$ = 310 ohms
$R_4$ = 30,000 ohms
$R_{5a}$ = 15,000 ohms
$R_{5b}$ = 930 ohms
$R_9$ = 897.5 ohms
$R_{10}$ = 50,000 ohms
$R_{11}$ = 71.4 ohms
$R_{12}$ = 10,000 ohms
$R_{13}$ = 20.02 ohms
$R_{15}$ = 421 to 1689 ohms In the electrical network of Fig. 7, voltage $E_T$ is developed between points B and C in accordance with the empirical function of temperature, and voltage $E_C$ is developed between points C and D as the empirical function of conductivity. The phase and polarity of the energizing voltages taken from transformer 20 are such that the algebraic summation of voltage $E_C$ and $E_T$ is opposed by the voltage developed between A, the position of slider 21 of slide wire R12 and point B. Point B is thus a common point and points A and D are connected as the input voltage to alternating current amplifier 22 of the servo system. Should a difference of voltage exist between point A and point D, this difference voltage is amplified and applied to energize motor 23 of the servo system which in turn adjusts sliding contact 21 in such a direction, determined by the phase of the difference voltage, that the network is again balanced and the difference voltage becomes zero.

The resistance of slide wire R12 is linear and the motion of slider 21 is also linear. Because the voltage between point B and point D is proportional to a logarithmic function, $\log (\sigma+20)$, and not to a linear function, of $\sigma$, the output appears non-linear on the linear slide wire R12. It is desirable that the adjustment of the indicator or pointer of recorder 4 should be linear in order to make possible mechanical adjustments for hull compression, to permit scale expansion in a manner to be discussed later, and to provide a chart scale easy to read. In order to provide for linear motion of the slide wire slider 21 and linear operation of the recorder 4, the necessary logarithmic function is inserted in the mechanical connection between motor 23 and slider 21. This can readily take the form of a logarithmic cam and cam follower mechanism.

As noted above, computer 5 has been shown diagrammatically connected by cable 9 to buoyancy recorder 4 and by cable 8 to measuring unit 6. The computer 5 includes in its housing the fixed resistance elements of the electrical network, amplifier 22, transformer 20, a phasing condenser, a fuse assembly and an operating switch. Also, as shown in Fig. 5, the recorder unit 4 includes in its housing both the electrical network balancing mechanism and the mechanical pen moving mechanism, further illustrated in Figs. 9 through 12, inclusive.

Figure 10:
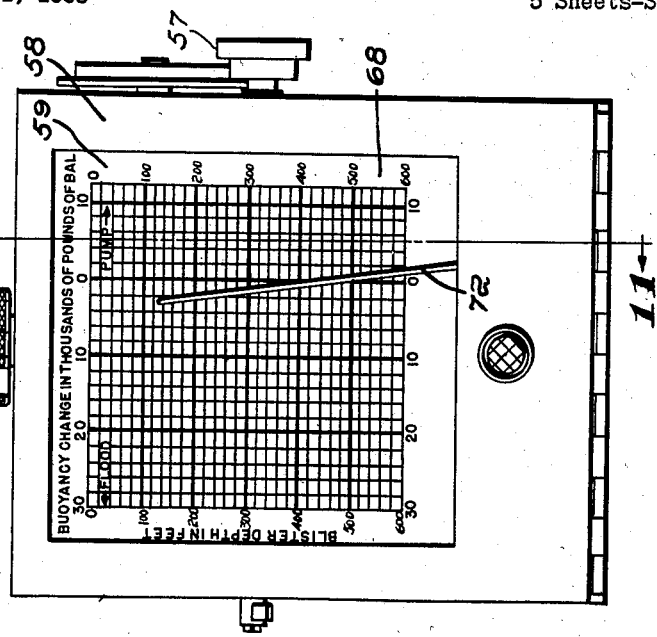
Fig. 10 is an elevational view of the recorder element further showing a buoyancy chart mounted in a recording position.
Figure 9:
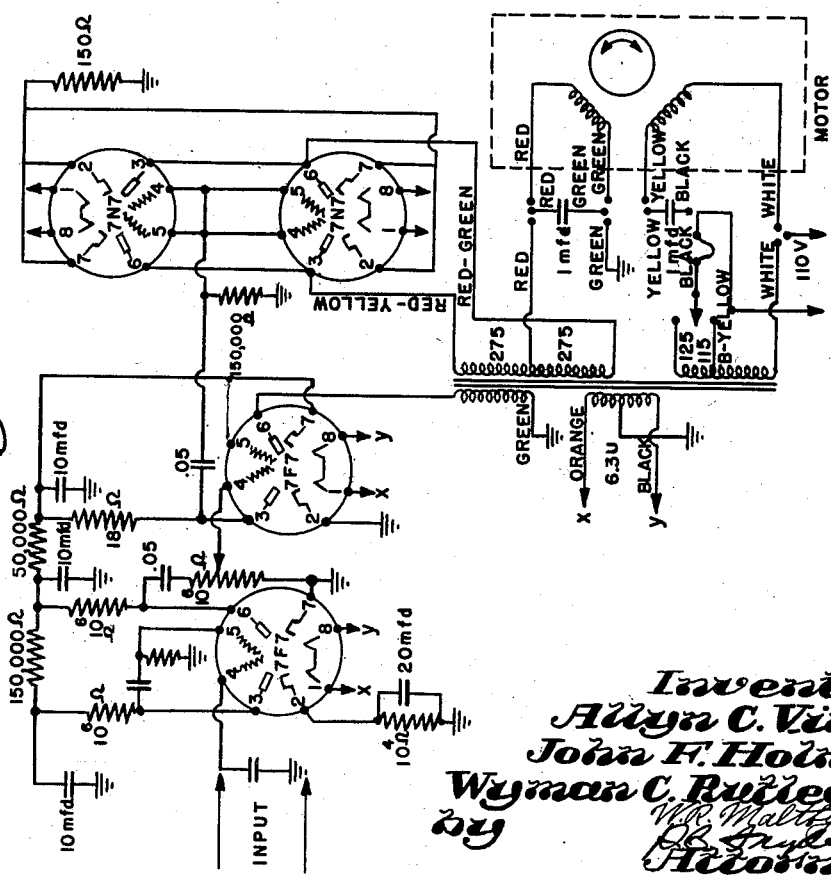
Fig. 9 is a circuit diagram for an amplifier employed in the buoyancy recorder.

The construction and manner of operation of the recorder mechanism is explained in complete detail in the above-identified application of Vine et al. In general, the recorder is housed in a casing which includes base members 50 and 52 to which are fastened sides 54 and 56 and a hinged front panel 58 of curved formation and carrying a glass window 59. Numeral 60 denotes a detachable rear panel. Suitable connecting plugs are provided in the sides 54 and 56, as well as a top plate 62 for receiving therethrough electrical and mechanical connections to the instrument components contained in the casing. Supported on the inner, upper surface of the casing is a curved chart-holding mechanism 66 which is adapted to locate a chart 68 directly in front of the window 59, as seen in Fig. 10, and in position to receive thereon a pen 70 carried by a curved arm 72 which is, in turn, fixed to one end of a pivot rod 100. The latter member has its opposite end pivotally connected in a frame 90 carried by the sliding carriage 81 of the recorder actuating mechanism.

Figure 11:
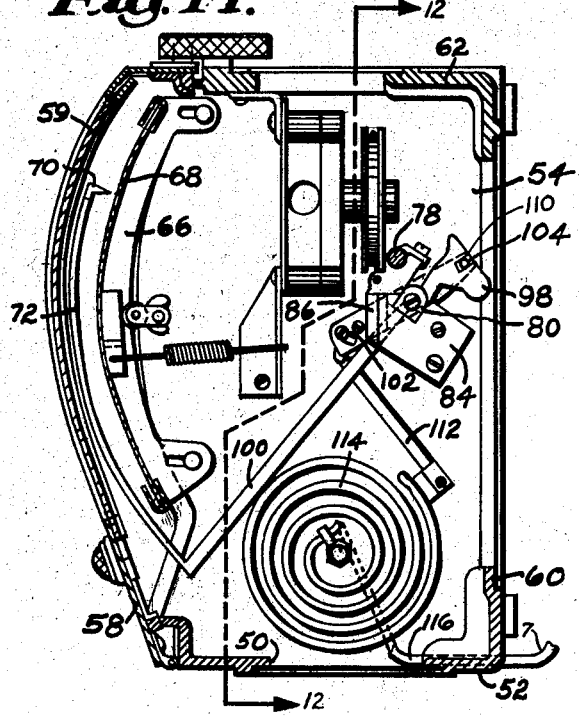
Fig. 11 is a vertical cross-sectional view taken on the line 11—11 of Fig. 10.
Figure 12:
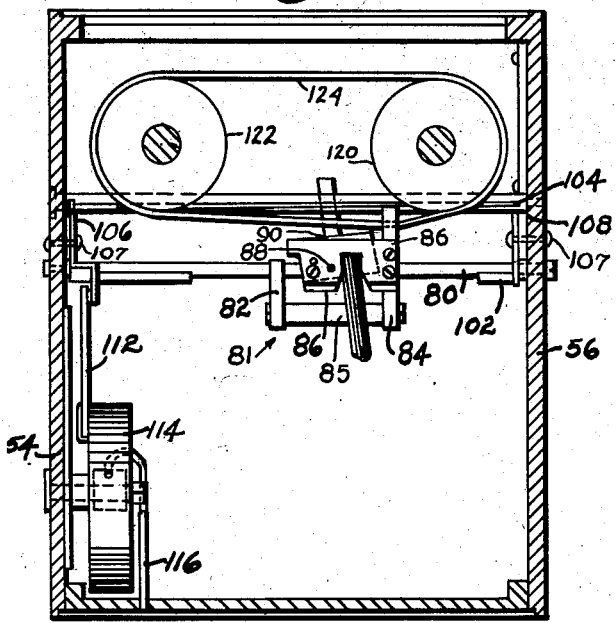
Fig. 12 is a cross section taken on the line 12—12 of Fig. 11.

Included in the actuating mechanism are two transverse parallel rods 78 and 80 which are firmly supported between the sides of the recorder casing, as shown in Figs. 11 and 12. Slidably mounted on these rods is carriage 81, consisting of plates 82 and 84 bolted to spacer 85 and supporting a front side 86. Pivoted on the front side 86 on a stud 88 is tilting frame 90. Arm 98 is pivotally mounted in frame 90 and has rigidly secured to its lower end pen support rod 100. Two additional transverse rods 102 and 104 are arranged parallel to each other and to rods 78 and 80. Rods 102 and 104 have their extremities rigidly secured in end plates 106 and 108, each of which plates is pivotally mounted in sides 54 and 55 by studs 107. The uppermost rod 104 is arranged so that it engages slot 110 in arm 98, whereby movement of shaft 104 by rotation of plates 106 and 108 on studs 107 in turn causes arm 98 to pivot in frame 90, thus moving rod 100 and pen arm 72 in a vertical direction over chart 68.

Attached to rod 102 at a point closely adjacent to end plate 106 is a link mechanism 112 which is in turn connected to a conventional Bourdon tube 114. With this arrangement, sea water pressure fluctuation acting through conduit 7 causes motion of Bourdon tube 114 at its free end which in turn actuates the link mechanism 112 and through the motion of pivoted rods 102 and 104 controls the vertical movement of pen arm 72.

As described above, it is desirable to have the motion of pen arm 72 in a horizontal direction as linear as possible. Accordingly, in the present invention the logarithmic function of density is taken from a linear motion by driving the slide wire contact arm 21 through a logarithmic cam 120. A motor pulley 122 driven by servomotor 23 drives the cam by means of cable 124 which is also attached to the carriage 81. The sliding carriage 81 is thereby moved by means of cable 124 to translate electrical changes into a horizontal displacement of the carriage 81 along the rods 78 and 80.

Figure 8:
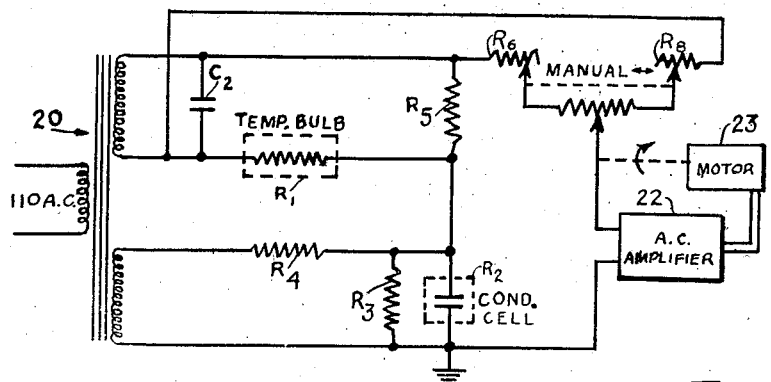
Fig. 8 is a wiring diagram indicating schematically an alternate bridge circuit for the computer element.

Since, with a cam as described, only a limited length of scale can be traversed and since the maximum change of water conditions in a typical submarine operation would not be taken care of thereby, it is necessary to expand the scale electrically at relatively high densities and contract it at relatively low densities in order to retain linearity of the output. One means of obtaining the desired result is to adjust the current flowing through the slide wire. In Fig. 7, adjusting the value of resistor R15 serves to adjust the range of voltage values obtainable by motion of the sliding contact 21 of slide wire R12. The adjustment of resistor R15 may be conveniently made through a shaft extending through the side wall 56 of the recorder housing and shown in Fig. 10 as controlled by knob 57. Fig. 8 illustrates an alternate bridge circuit which is essentially similar to the arrangement shown in Fig. 7 except that the temperature bulb $R_1$ has been removed from the bride circuit and now is connected in series with resistor $R_5$ across one of the secondary windings of transformer 20. Also, the voltage opposing $E_C$ and $E_T$ which appears across $R_3$ and $R_5$, respectively, is derived from this same winding and has the proper out-of-phase polarity by virtue of the manner in which it energizes resistors $R_6$, $R_8$ and the potentiometer connected therebetween. It will thus be seen that the juncture of resistors $R_5$ and $R_6$ is a common point similar to point B in Fig. 7 and that the grounded end of resistor $R_3$ and the movable contact of the variable resistance interconnecting $R_6$ and $R_8$ correspond to points D and A so that amplifier 22 is energized by an A. C. voltage whose amplitude and polarity depend upon the degree and direction of unbalance of the resistance network.

In operation, when the submarine is first trimmed, the pen is moved to the zero ballast line on chart 68 of Fig. 10. This may be conveniently done by turning knob 57 on the side of the recorder as a zero adjustment. As the submarine moves to a different depth, the pen traces a record of buoyancy versus depth. If the pen moves to the right of the zero line of the chart as viewed in Fig. 10 the boat has become heavier and ballast must be pumped to regain zero buoyancy and a good trim. If the pen moves to the left of the zero line, the submarine is becoming lighter and flooding of the ballast tanks is indicated.

Obviously many modifications and variations of the present invention are possible in the light of the above teachings. It is therefore to be understood that within the scope of the appended claims the invention may be practiced otherwise than as specifically described.

We claim:

1. In apparatus for computing and indicating the density of sea water according to a mathematical equation of the form $$\log (\text{density}+K_5) = \tfrac{1}{2} \log [(C+K_2)^2 - K_3] - K_4 T^n + \log K_1$$

wherein $K_1$, $K_2$, $K_3$, $K_4$, $K_5$ and $n$ represent empirically obtained constants, T represents sea water temperature in degrees Fahrenheit and C represents the electrical conductivity of sea water in mhos/c.c., in combination, a potential source, a thermometer bulb whose electrical resistance varies according to a known function of temperature, a resistance bridge energized from said source and having said bulb in one arm thereof, said bridge having bridge arm ratios and resistances selected such that the unbalance voltage thereof in response to temperature values corresponds to the temperature term $-K_4 T^n$ of the aforesaid equation, a conductivity cell whose resistance is a function of the cell dimensions and the specific resistance of the fluid in which it is immersed, means for energizing said conductivity cell from said source, said energizing means including series and shunt resistances having values selected such that the voltage across said cell corresponds to the conductivity term $\tfrac{1}{2} \log[(C+K_2)^2 - K_3]$ of said equation, a slide wire energized from said potential source and having a slider selecting a local voltage as a function of the position thereof, a balancing network combining the algebraic summation of the voltage corresponding to said temperature term and the voltage corresponding to said conductivity term with said local voltage to produce a difference voltage and a servo system responsive to said difference voltage to position said slider in a direction tending to reduce said difference voltage to zero, whereby the position of said slider is a measure of said sea water density when said difference voltage is zero.

2. Apparatus for computing and indicating the buoyancy changes of a submerged vessel by use of measured sea water variables and relating buoyancy to sea water density computed from a mathematical equation of the form $$\log (\text{density}+K_5) = \tfrac{1}{2} \log [(C+K_2)^2 - K_3] - K_4 T^n + \log K_1$$

wherein $K_1$, $K_2$, $K_3$, $K_4$, $K_5$ and $n$ represent empirically obtained constants, T represents sea water temperature in degrees Fahrenheit and C represents the electrical conductivity of sea water in mhos/c.c., comprising a potential source, a thermometer bulb responsive to sea water temperature whose electrical resistance varies according to a known function of temperature, a resistance bridge energized from said source and having said bulb in one arm thereof, said bridge having bridge arm ratios and resistances selected such that the unbalance voltage thereof in response to temperature values corresponds to the temperature term, $-K_4 T^n$, of the aforesaid equation, a conductivity cell exposed to said sea water whose resistance is a function of the cell dimensions and the specific resistance of the sea water in which it is immersed, means for energizing said conductivity cell from said source, said energizing means including series and shunt resistances connected to said cell and having values selected such that the voltage across said cell corresponds to the conductivity term, $\tfrac{1}{2} \log [(C+K_2)^2 - K_3]$, of said equation, a voltage dropping resistance network energized from said potential source, said network including a slide wire having a slider selecting a local voltage as a function of the position thereof, a balancing network combining the algebraic summation of the voltage corresponding to said temperature term and the voltage corresponding to said conductivity term with said local voltage to produce a difference voltage, voltage sensitive means responsive to said difference voltage, motor means responsive to said voltage sensitive means and acting to position said slider in a direction to reduce said difference voltage to zero, whereby the position of said slider becomes indicative of said sea water density when said voltage sensitive means produces zero response, and means for adjusting the voltage selected by said slider for any given position on said slide wire in accordance with the depth of said submerged vessel to compensate said density indication for the depth of submersion of said vessel to derive an indication of buoyancy.

3. Apparatus for computing and indicating the buoyancy changes of a submerged vessel by use of measured sea water variables and relating buoyancy to sea water density computed from a mathematical equation of the form $$\log (\text{density}+K_1) = \tfrac{1}{2} \log [(C+K_2)^2 - K_3] - K_4 T^n + \log K_5$$

wherein $K_1 = 20$, $K_2 = 0.0815$, $K_3 = 0.0068$, $K_4 = 0.003296$, $K_5 = 897.9$, $n = 1.07$, T represents sea water temperature in degrees Fahrenheit and C represents the electrical conductivity of the sea water in mhos/c.c. comprising a potential source, a thermometer bulb responsive to sea water temperature whose electrical resistance varies according to a known function of temperature, a resistance bridge energized from said source and having said bulb in one arm thereof, said bridge having bridge arm ratios and resistances selected such that the unbalance voltage thereof in response to temperature values corresponds to the temperature term, $-0.003246 T^{1.07}$, of the aforesaid equation, a conductivity cell exposed to said sea water whose resistance is a function of the cell dimensions and the specific resistance of the sea water in which it is immersed, means for energizing said conductivity cell from said source, said energizing means including series and shunt resistances connected to said cell and having values selected such that the voltage across said cell corresponds to the conductivity term $\frac{1}{2} \log [(C+0.0815)^2 - 0.0068]$ of said equation, a voltage dropping resistance network energized from said potential source, said network including a slide wire having a slider selecting a local voltage as a function of the position thereof, a balancing network combining the algebraic summation of the voltage corresponding to said temperature term and the voltage corresponding to said conductivity term with said local voltage to produce a difference voltage, voltage sensitive means responsive to said difference voltage, motor means responsive to said voltage sensitive means and acting to position said slider in a direction to reduce said difference voltage to zero, whereby the position of said slider becomes indicative of said sea water density when said voltage sensitive means produces zero response, and means for adjusting the voltage selected by said slider for any given position on said slide wire in accordance with the depth of said submerged vessel to compensate said density indication for the depth of submersion of said vessel to derive an indication of buoyancy.

References Cited in the file of this patent

UNITED STATES PATENTS

| | | |
|---|---|---|
| 2,579,220 | Vine | Dec. 18, 1951 |
| 2,581,205 | Reilly | Jan. 1, 1952 |
| 2,636,151 | Hornfeck | Apr. 21, 1953 |
| 2,638,783 | Rittner et al. | May 19, 1953 |
| 2,673,030 | Isserstedt | Mar. 23, 1954 |

OTHER REFERENCES

"Computing circuits and devices for industrial process functions" (Hornfeck), Transactions of AIEE, vol. 71, part I, pages 183–193, July 1952.

Electronic Analog Computers (Korn and Korn), published by McGraw-Hill Book Co., 1952, pages 255–265.